US006572251B1

United States Patent
Huang

(10) Patent No.: US 6,572,251 B1
(45) Date of Patent: Jun. 3, 2003

(54) LIGHT EMITTING ASSEMBLY FOR VEHICLE WHEEL

(76) Inventor: Teng Wen Huang, 3 F., No. 7, Lane 163, Hsin-Yi Rd., Pan Chiao City, Taipei Hsien (TW)

(*) Notice: Subject to any disclaimer, the term of this patent is extended or adjusted under 35 U.S.C. 154(b) by 0 days.

(21) Appl. No.: 10/022,196

(22) Filed: Dec. 20, 2001

(51) Int. Cl.$^7$ ................ B60Q 1/00; B60Q 1/26
(52) U.S. Cl. ........... 362/500; 362/800; 362/802; 362/464; 362/473
(58) Field of Search ................ 362/500, 464, 362/800, 802, 473

(56) References Cited

U.S. PATENT DOCUMENTS 5,392,200 A * 2/1995 Milde ................ 362/78
6,485,169 B1 * 11/2002 Ragner ................ 362/500

FOREIGN PATENT DOCUMENTS

GB 2237369 A * 1/1991 ............ F21L/7/00

* cited by examiner

Primary Examiner—Sandra O'Shea
Assistant Examiner—Sharon Payne
(74) Attorney, Agent, or Firm—Bacon & Thomas, PLLC

(57) ABSTRACT

A lighting assembly for vehicle wheel is disclosed, which includes a casing holding a battery cell in a receiving open chamber in one end thereof, a circuit board having a LED disposed outside the casing and two annular metal contacts disposed inside the receiving open chamber and respectively connected to the two electrodes of the LED, a lead frame mounted in the receiving open chamber and electrically connected between one pole of the battery cell and one annular metal contact of the circuit board, and an elastic metal contact member suspended from the circuit board and connected to one annular metal contact and adapted to close the circuit of the battery cell and the LED when forced by centrifugal force upon rotation of the wheel in which the casing is installed.

10 Claims, 4 Drawing Sheets

LIGHT EMITTING ASSEMBLY FOR VEHICLE WHEEL

BACKGROUND OF THE INVENTION

1. Field of the Invention

The present invention relates to a light emitting assembly for vehicle wheel and, more particularly, to a light emitting assembly that is activated to emit light by centrifugal force upon rotation of the vehicle wheel.

2. Description of Related Art

A vehicle tire may be mounted with a light emitting assembly, which emits light to give a visual warning signal and, to produce a lighting effect simultaneously. Because the light emitting assembly is controlled manually through a manual switch, it continuously consumes battery power if the user forgets to switch off after parking of the vehicle.

Therefore, it is desirable to provide a light emitting assembly for vehicle wheel that eliminates the aforesaid problem.

SUMMARY OF THE INVENTION

The main object of the present invention is to provide a light emitting assembly for vehicle wheel, which is automatically activated to emit light upon running of the vehicle. Another object of the present invention is to provide a light emitting assembly for vehicle wheel, which is automatically turned off to eliminate waste of battery power when the vehicle is stopped.

To achieve these and other objects of the present invention, the light emitting assembly for vehicle wheel comprises a casing, a circuit board, a lead frame, and an elastic metal contact member. The casing is fixedly fastened to one wheel of a vehicle, comprising a receiving open chamber in one end thereof and a battery cell mounted in the receiving open chamber. The circuit board is mounted on the casing, having a first sidewall disposed outside the receiving open chamber of the casing, a light emitting element installed in the first sidewall, a second sidewall facing the receiving open chamber of the casing, a first annular metal contact and a second annular metal contact concentrically disposed in the second sidewall and electrically connected to the two opposite electrodes of the light emitting element respectively. The second annular metal contact is electrically connected to one terminal of the battery cell through the casing. The lead frame is suspended in the receiving open chamber and spaced between the first annular metal contact and the second annular metal contact and is electrically connected to the other terminal of the battery cell. The springy metal contact member is suspended from the first annular metal contact of the circuit board. During rotation of the wheel, the elastic metal contact member is forced by centrifugal force to contact the lead frame, and therefore the LED is turned on to emit light. On the contrary, when the wheel is stopped, the elastic metal contact member is disconnected from the lead frame and returns to its former position so as to turn off the LED.

Other objects, advantages, and novel features of the invention will become more apparent from the following detailed description when taken in conjunction with the accompanying drawings.

BRIEF DESCRIPTION OF THE DRAWINGS

FIG. 3 is similar to FIG. 2 but showing the light emitting diode turned on.

DETAILED DESCRIPTION OF THE PREFERRED EMBODIMENTS

Figure 1:
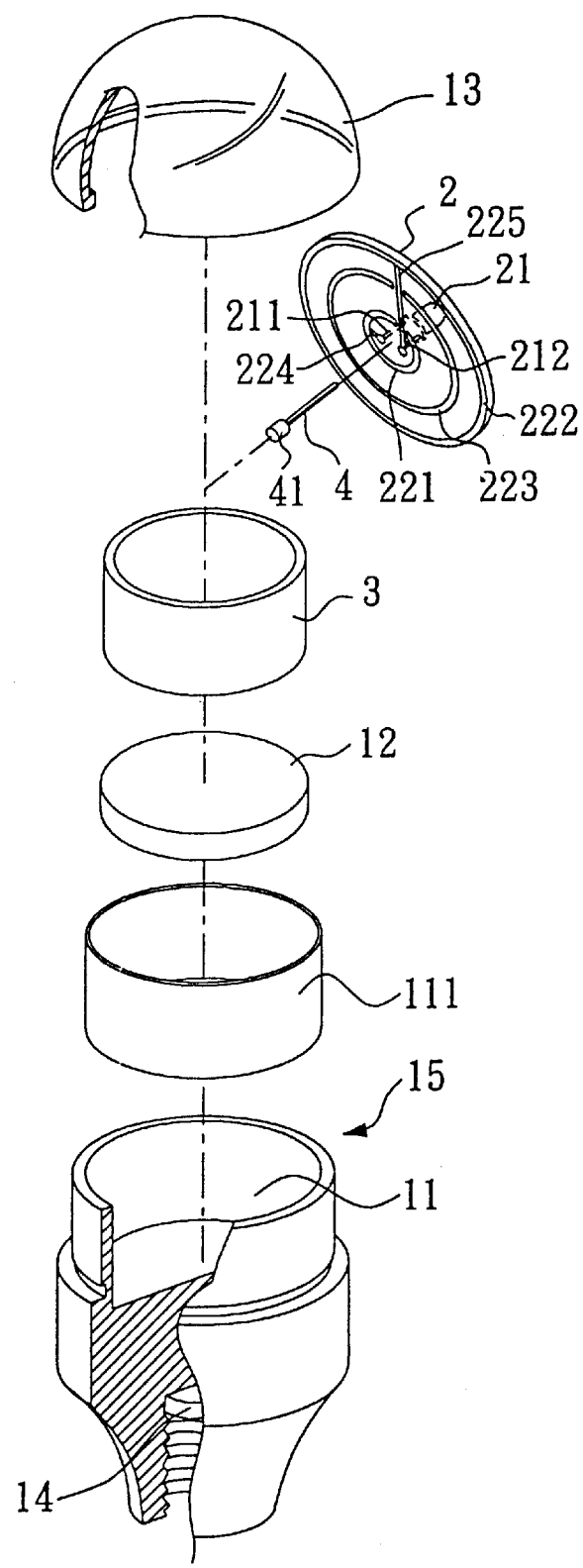
FIG. 1 is an exploded view of a light emitting assembly for vehicle heel according to the present invention.
Figure 2:
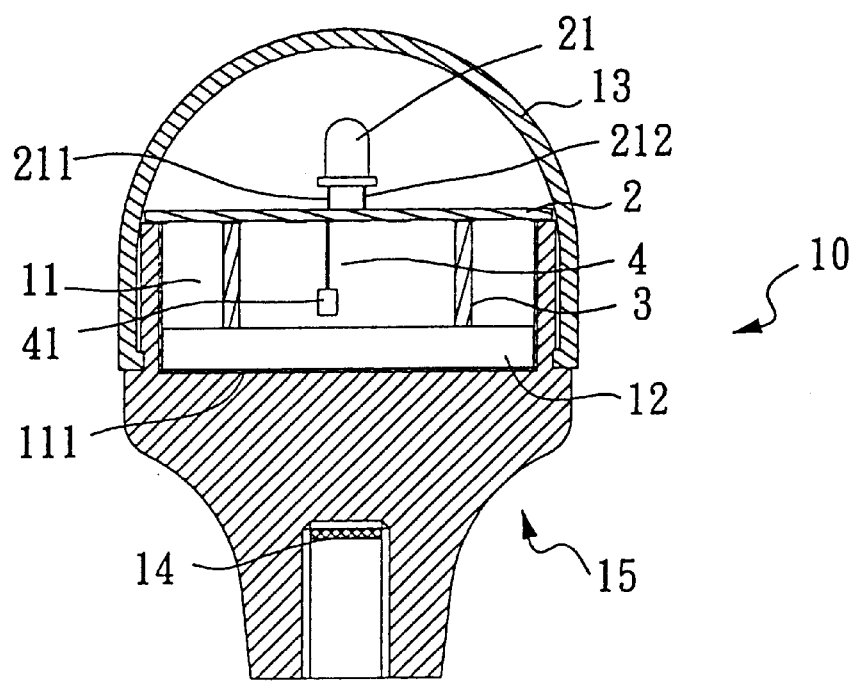
FIG. 2 is a sectional assembly view of the light emitting assembly or vehicle wheel when turning off a light emitting diode according to the present invention.

With reference to FIGS. 1 and 2, a light emitting assembly for vehicle wheel in accordance with the present invention is designed for installation in the cap of the air valve of one wheel of a vehicle. The light emitting assembly is activated to emit light by centrifugal force upon rotation of the wheel. As illustrated, the light emitting assembly for vehicle wheel is comprised of a casing 15, a circuit board 2, a lead frame 3, and an elastic metal contact member 4. The casing 15 is made of electrically insulative material and is fixedly fastened to the air valve of one wheel of a vehicle with one end thereof comprising a gasket 14 which prevents exhausting of tire air, a receiving open chamber 11 defined in the other end thereof. The receiving open chamber 11 holds a metal contact cup 111 and a battery cell 12 which is in the metal contact cup 111. The circuit board 2 is disposed on the receiving open chamber 11 of the casing 15, comprising a light emitting device, for example a LED (light emitting diode) 21, a first annular metal contact 221 fixed at the bottom of the casing 15, a second annular metal contact 222 fixed at the bottom of the casing 15 and concentrically disposed around the first annular metal contact 221, and a third annular metal contact 223 fixed at the bottom of the casing 15 and concentrically spaced between the first annular metal contact 221 and the second annular metal contact 222. One electrode, namely, the first electrode 211 of the LED 21 is connected to the first annular metal contact 221 by a first lead wire 224. The other electrode, namely, the second electrode 212 of the LED 21 is connected to the second annular metal contact 222 by a second lead wire 225. The first lead wire 224 and the second lead wire 225 are covered respectively by electrically insulative covering means. The second annular metal contact 222 is disposed in contact with the metal contact cup 111 which is disposed in contact with the positive pole of the battery cell 12. The lead frame 3 is mounted inside the receiving open chamber 11 of the casing 15 between the first annular metal contact 221 and the second annular metal contact 222, having one end disposed in contact with the negative pole of the battery cell 12 and the other end soldered to the third annular metal contact 223 of the circuit board 2. The elastic metal contact member 4 can be a thin metal sheet or a metal spring element, having one end fixed to the bottom of the circuit board 2 and electrically connected to the first annular metal contact 221 and the other end fixedly mounted with a metal weight 41. Further, a transparent shield 13 is provided with to cover the casing 15 over the circuit board 2.

When the vehicle is stopped, the first electrode 211 of the LED 21 is electrically connected to the first annular metal contact 221 and the elastic metal contact member 4, the second electrode 212 of the LED 21 is connected to the second annular metal contact 222 and is in contact with the positive pole of the battery cell 12 through the metal contact cup 111, and the negative pole of the battery 12 is electrically connected to the lead frame 3 and the third annular metal contact 223 and is disconnected from the electrode 211, and therefore the LED 21 is off.

Figure 3:
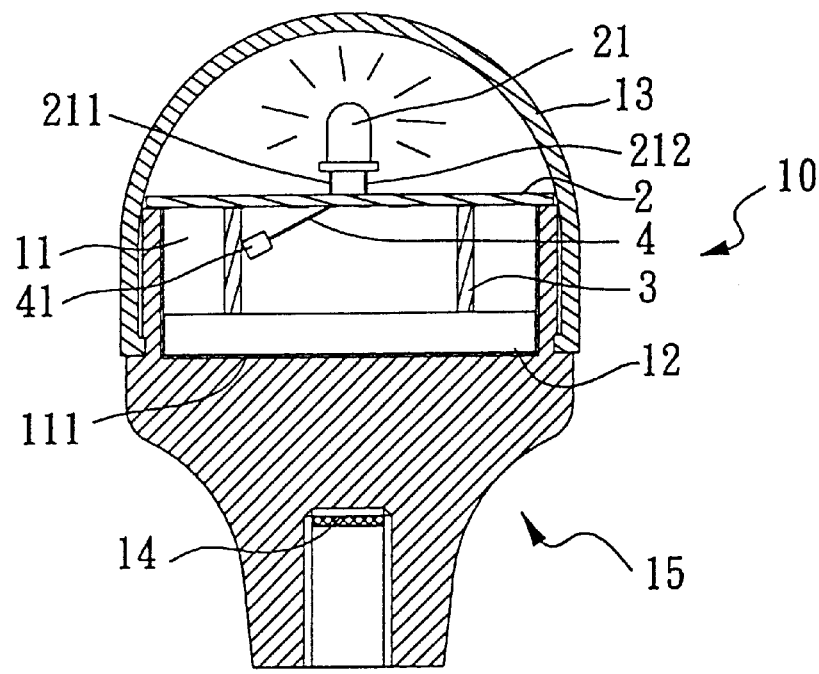

Referring to FIG. 3, when the wheel rotates, the elastic metal contact member 4 and a metal weight 41 which is attached to a free end of the elastic metal contact member 4 are forced by centrifugal force to contact the lead frame 3, thereby causing the negative pole of the battery cell 12 to be electrically connected to the lead frame 3, the elastic metal contact member 4, and the first electrode 211 of the LED 21. At this time, the first electrode 211 of the LED 21 is electrically connected to the negative pole of the battery cell 12, and the second electrode 212 of the LED 21 is electrically connected to the positive pole of the battery 12, forming a closed loop, and therefore the LED 21 is turned on to emit light. When the wheel of the vehicle is stopped, the elastic metal contact member 4 is immediately returned to the off position shown in FIG. 2 without contacting the lead frame 3, and therefore the LED 21 is automatically turned off.

Figure 4:
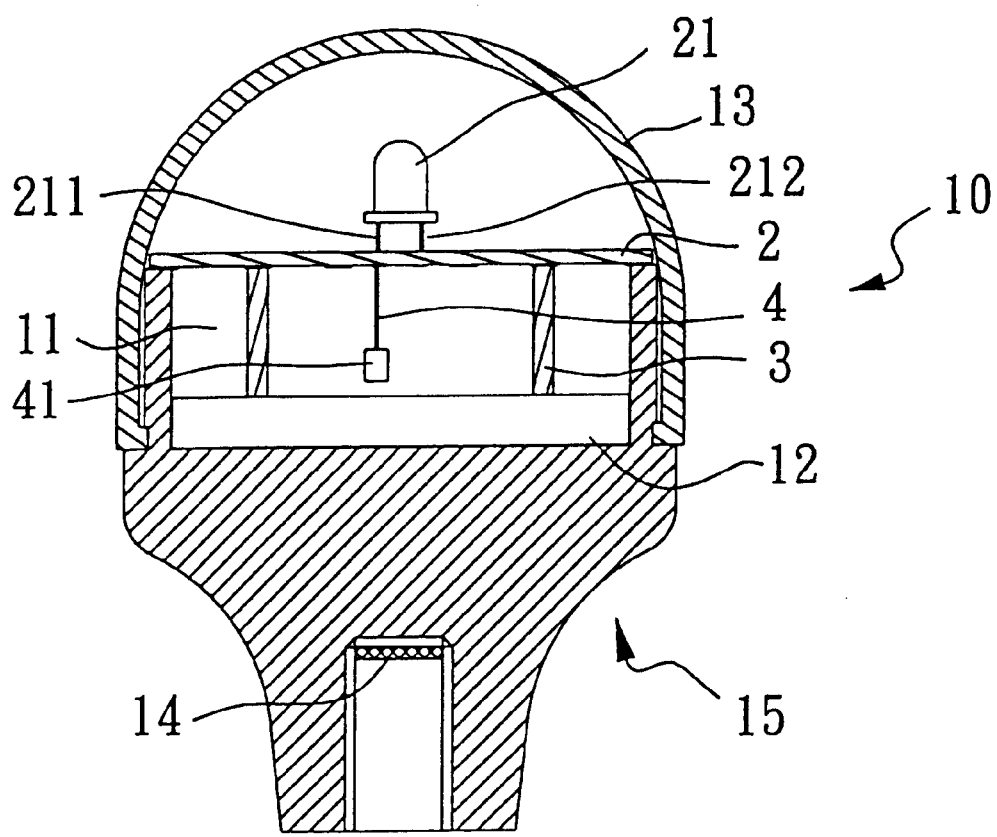
FIG. 4 is a sectional view of an alternative form of the light emitting assembly according to the present invention.

FIG. 4 shows an alternative form of the present invention. According to this alternative form, the casing 15 is made of electrically conductive material, the aforesaid metal contact cup 111 is eliminated, and the second annular metal contact 222 is electrically connected to the positive pole of the battery cell 12 through the casing 15. FIG.

Figure 5:
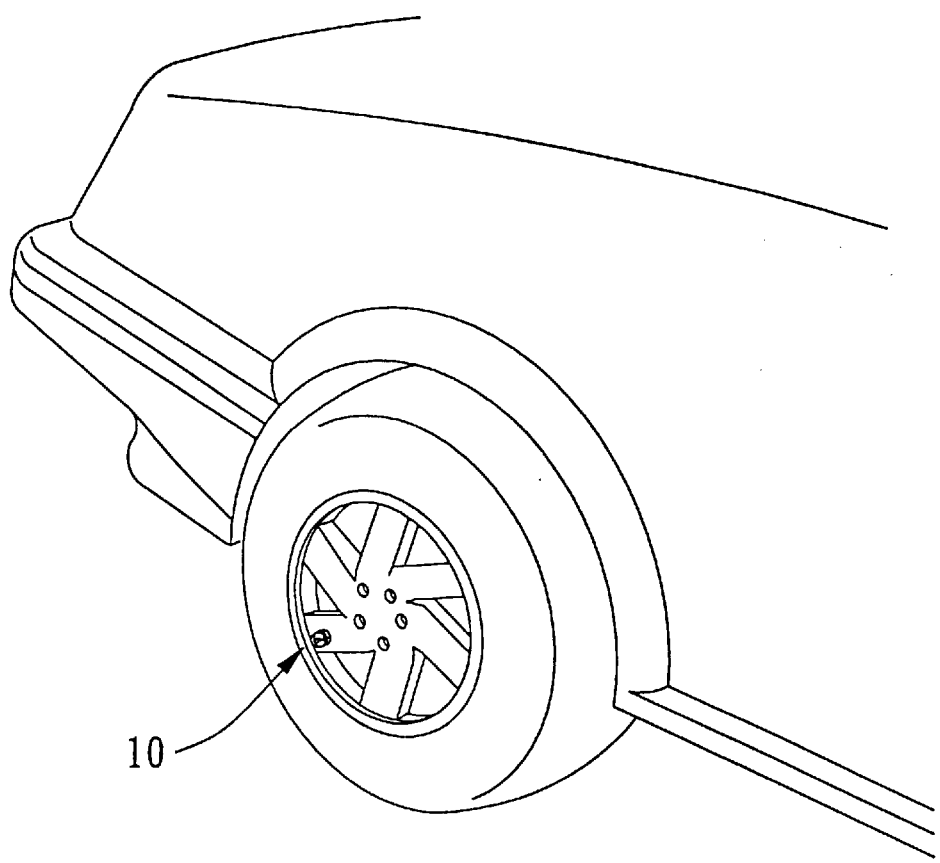
FIG. 5 is a schematic view of the present invention showing the light emitting assembly installed in the air valve of a car.
Figure 6:
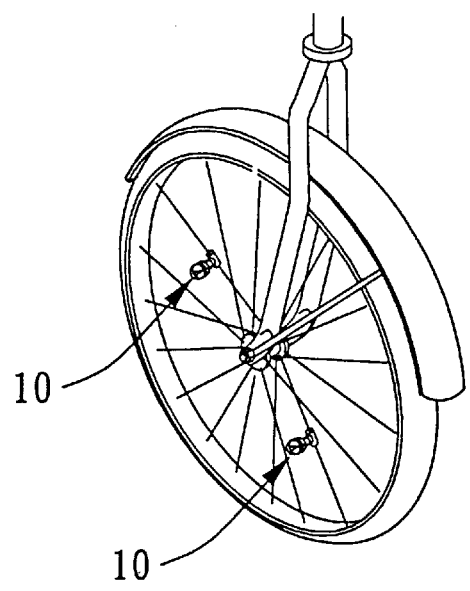
FIG. 6 is another schematic view of the present invention showing the light emitting assembly installed in the spokes of a bicycle.

FIG. 5 shows an installation example of the present invention. According to this installation example, the light emitting assembly 10 is directly plugged into a plughole in the rim of the wheel of the motor vehicle. FIG. 6 shows another installation example of the present invention. According to this installation example, the light emitting assembly 10 is fixedly fastened to the spokes of the vehicle (bicycle) wheel.

Although the present invention has been explained in relation to its preferred embodiments, it is to be understood that many other possible modifications and variations can be made without departing from the scope of the invention as hereinafter claimed.

What is claimed is:

1. A lighting assembly installed in one wheel of a vehicle and adapted for emitting light upon running of the vehicle, comprising:

a casing, comprising a receiving open chamber in one end thereof and a battery cell mounted in said receiving open chamber;

a circuit board mounted on said casing, said circuit board having a first sidewall disposed outside said receiving open chamber of said casing, a light emitting element installed in said first sidewall, a second sidewall facing said receiving open chamber of said casing, a first annular metal contact and a second annular metal contact concentrically disposed in said second sidewall and respectively electrically connected to two opposite electrodes of said light emitting element, said second annular metal contact being electrically connected to one pole of said battery cell through said casing;

a lead frame suspended in said receiving open chamber and spaced between said first annular metal contact and said second annular metal contact and electrically connected to the other pole of said battery cell; and an elastic metal contact member extending from said first annular metal contact of said circuit board and adapted for contacting said lead frame to turn on said light emitting element by means of the centrifugal force effected upon rotation of the wheel of the vehicle.

2. The lighting assembly as claimed in claim 1, wherein said casing is made of electrically insulative material, and fixedly mounted with a metal contact cup in said receiving open chamber to electrically connect said second annular metal contact to one pole of said battery cell.

3. The lighting assembly as claimed in claim 1, wherein said casing is made of electrically conductive material to electrically connect said second annular metal contact to one pole of said battery cell.

4. The lighting assembly as claimed in claim 1, wherein said light emitting element is a light emitting diode.

5. The lighting assembly as claimed in claim 1, wherein said lead frame is a metal ring.

6. The lighting assembly as claimed in claim 1, wherein said elastic metal contact member is a thin sheet of metal.

7. The lighting assembly as claimed in claim 6, wherein said thin sheet of metal has a fixed end fixedly connected to said first annular metal contact of said circuit board and a free end fixedly mounted with a metal weight.

8. The lighting assembly as claimed in claim 1, wherein said metal has a fixed end fixedly connected to said first annular metal contact of said circuit board and a free end fixedly mounted with a metal weight.

9. The lighting assembly as claimed in claim 1 further comprising a transparent shield fixedly fastened to the top of said casing and covering over said circuit board and said light emitting element.

10. The lighting assembly as claimed in claim 1, wherein said circuit board further comprises a third annular metal contact disposed in said second sidewall and respectively electrically insulative between said first annular metal contact and said second annular metal contact and electrically connected to said lead frame.

* * * * *